UNITED STATES PATENT OFFICE.

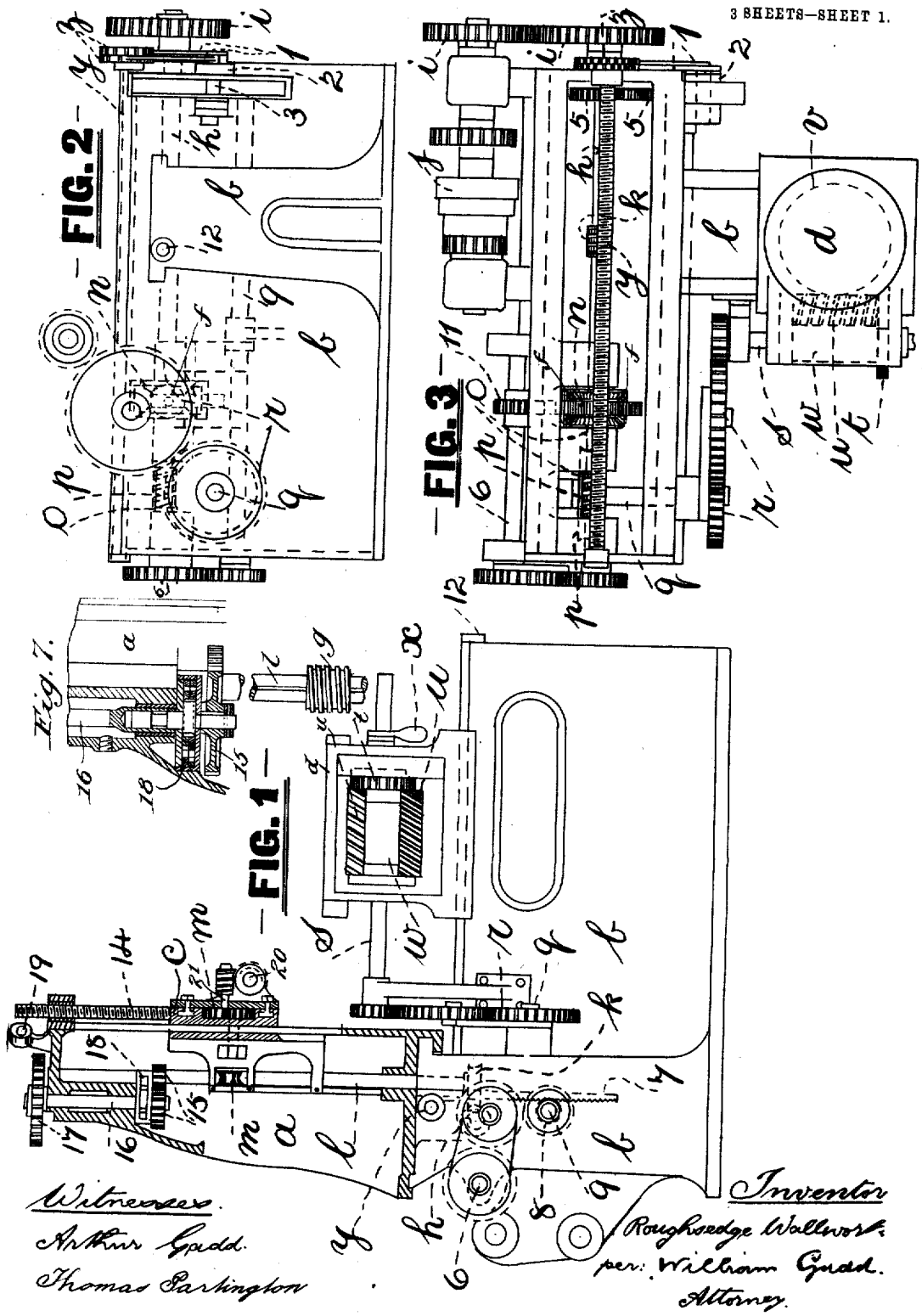

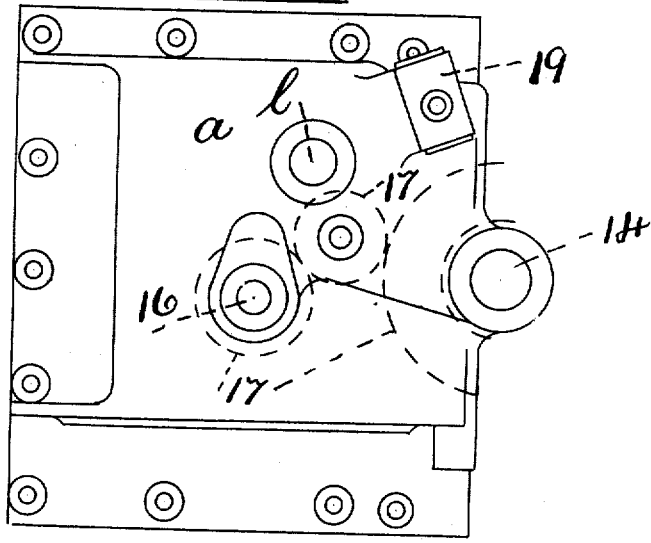
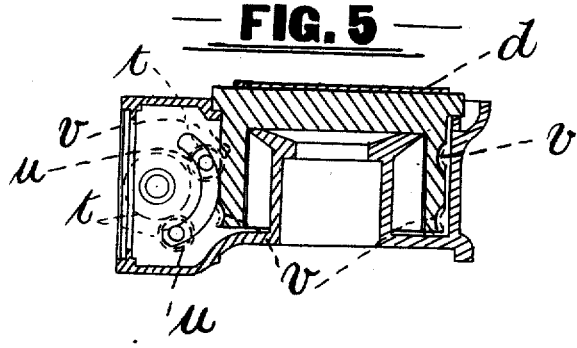

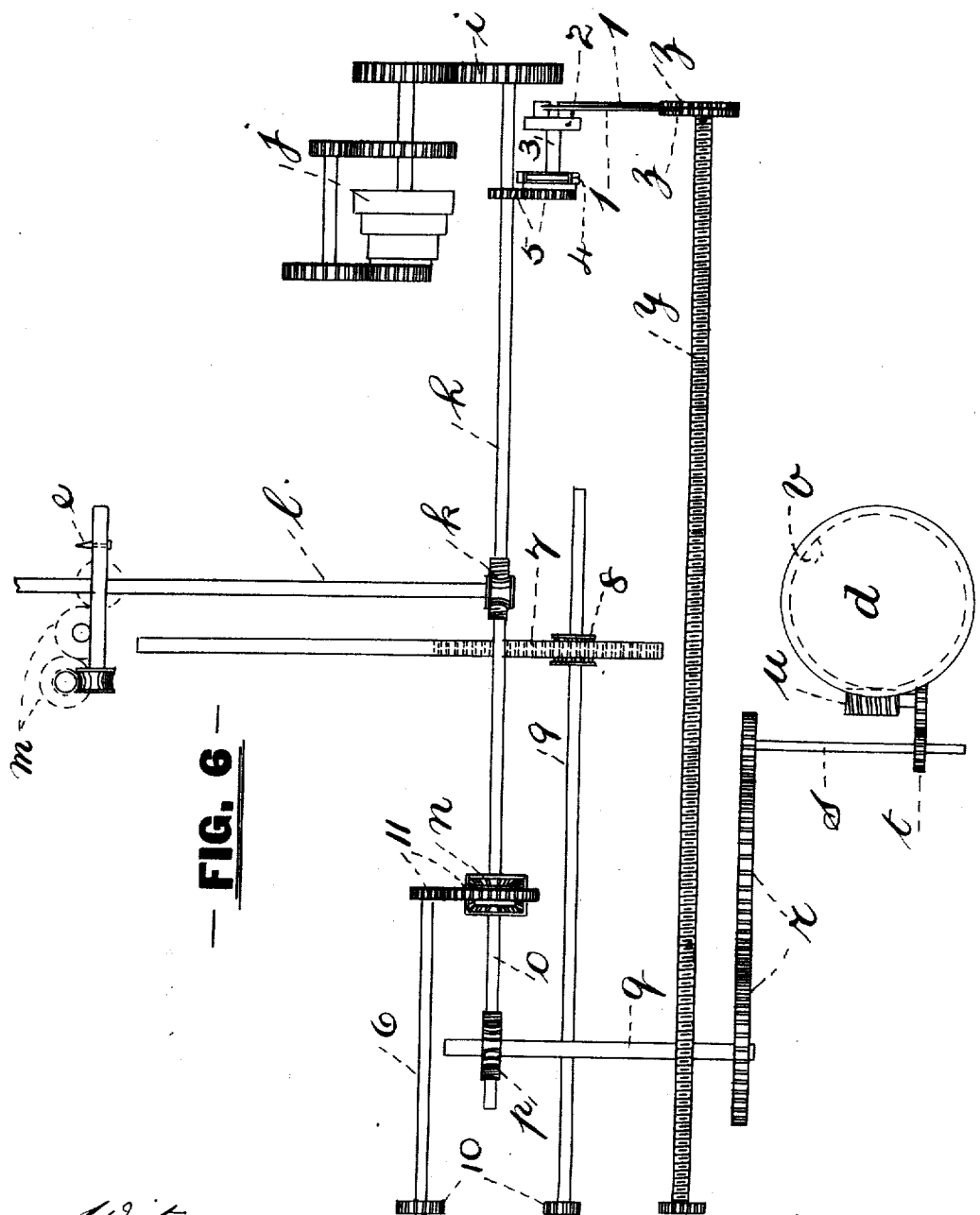

ROUGHSEDGE WALLWORK, OF MANCHESTER, ENGLAND.

GEAR-GENERATING MACHINE.

No. 915,811.  Specification of Letters Patent.  Patented March 23, 1909.

Application filed November 9, 1907. Serial No. 401,467.

*To all whom it may concern:*

Be it known that I, ROUGHSEDGE WALL-WORK, a subject of the King of Great Britain, residing at Union Bridge Ironworks, Roger street, Manchester, in the county of Lancaster, England, have invented a new and useful Improvement in Gear-Generating Machines, of which the following is a specification.

The improvement relates to gear generating machines and has for object to provide a machine wherein may be cut the teeth of spurs, spirals, worm wheels, worms, or wherein circular milling may be accomplished, whether such spurs be cut with a hob, or a single cutter, or the worm wheels be cut with hobs or fly cutters, and similarly for the spiral gears, in the manner hereinafter to be described. Flat or hollow faced gears may also be cut upon the machine aforesaid, as desired.

For the purpose of more clearly describing the present invention, reference is made to the accompanying sheets of drawings, wherein—

Figure 1 is a side elevation of the main portion of the gear generating machine, with the carriage part thereof in section. Fig. 2 is a front view of the machine, the carriage, table, and certain other parts being omitted for the sake of clearness, and Fig. 3 is a plan view of the machine, the table included, all according to one form of my invention. Fig. 4 is a view on an enlarged scale of the top of the carriage shown in Fig. 1, gear wheels being indicated by broken lines only. Fig. 5 is a detail, on a different scale, of a portion of the machine in connection with the table thereof. Fig. 6 is a diagrammatic view, arranged in one plane, of the main mechanical parts employed according to the form described of the present invention. Fig. 7 is a sectional view of a portion of Fig. 1, on an enlarged scale.

The principal moving parts of the machine consist of a carriage $a$ capable of sliding or moving transversely across the machine bed $b$, a saddle $c$ mounted upon the carriage $a$ and capable of moving vertically thereon, a table $d$ for the wheel or work operated upon capable of sliding or moving on the bed to and from the saddle aforesaid, which table $d$ is also capable of rotation. The machine bed may be conveniently of tee shape as shown, the table $d$ being capable of sliding upon the leg portion of such tee, and the carriage $a$ sliding upon the head portion thereof, at right angles with the former. The cutter $e$, here shown in place of a hob, (see Fig. 6), is mounted upon a mandrel supported by the saddle $c$. In Fig. 1 the mandrel 20 is shown capable of angular adjustment by the rotation around the worm shaft 21, as an axis, of the portion of the saddle $c$ supporting said mandrel, such movable portion here taking the form of a circular face connection upon which the mandrel is mounted.

The mechanical means for obtaining the correct relative motions of the parts of the machine before named, some of which, however, not being involved in certain cutting operations, consist in the main of a shaft $h$ connected by change wheels such as $i$ with an ordinary driving headstock such as $j$, which first named shaft $h$ is connected by spiral gear $k$ (capable of sliding along the shaft $h$,) to a vertical shaft $l$ within the carriage $a$, said vertical shaft $l$ being also connected by suitable gear wheels, such as $m$ to the cutter $e$ through the mandrel upon which it is mounted. A key-way is formed in the shaft $l$ to enable a worm $g$, forming part of the gear $m$, to move with the saddle $c$ while operated by the shaft $l$ (see more particularly Fig. 7.) The shaft $h$ is terminated by or provided with a set of differential wheels or nest of bevels $n$. The said differentials are in connection with a shaft $o$, which shaft is connected by worm and wheel $p$ to a cross shaft $q$, the latter being connected by suitable change wheels, such as $r$, to another shaft $s$. Gear wheels $t$ connect the shaft $s$ to the worms $u$ for the purpose of rotating the same, which worms may be put into gear with the worm wheels $v$ controlling the rotary movement of the table. It is arranged that only one of the worms $u$ can be in gear with a wheel $v$ at any one time, that is to say, the rocker $w$ upon which the worms are mounted is capable of being rotated or rocked upon the shaft $s$ by means of the hand lever $x$, from which it will be seen that when one of the worms is in gear with its corresponding wheel $v$, the other worm is turning, but out of gear with the other wheel such as indicated in Fig. 5. In this figure a curved slot is indicated to allow of the worms being put in and out of gear, the wheels $t$ being constantly in gear. The object of the worms $u$ is to prevent excessive rise in the change wheels employed, one of the said worms being used solely for the higher speed only; the difference in pitch of the two worms being suitably arranged to allow of this. It is obvious that the system may be applied to a set of more than two worms, for the same or similar purpose.

A feed screw $y$ is provided for operating the sliding carriage $a$, which screw is rotated at the requisite speed by means of a pair of ratchet wheels $z$ operated by a pair of pawls 1 acting on opposite sides, one for each ratchet wheel, and thus arranged so as to give a continuous motion to the said screw. That is to say, one of the pawls 1 has not ceased to move in the one direction before the other pawl commences to move in the opposite direction. To enable this to be done, and to provide the necessary feed, the opposite ends of these pawls are connected, eccentrically, to a disk 2 mounted upon a shaft 3 operated by epicyclic gear indicated at 4 in connection with spur wheels 5 to the shaft $h$. In Fig. 2 the box for the epicyclic and spur gears is merely shown, and in Fig. 6 the relative positions of the said epicyclic gear and the feed screw $y$ appear to be reversed on account of the parts in the latter figure being brought into one plane. The said feed screw $y$ is also in gear connection, when requisite, through an extra shaft 6, with the idler wheels $f$, carried by the usual spur rim indicated of the differential gear $n$, whereby the retardation or acceleration, of the work being cut may be obtained.

The retardation, or acceleration, of rotation of the work being cut, may be combined with the vertical movement of the saddle $c$, such as in the cutting of spirals, by employing a vertical rack 7 attached to such saddle, and in gear connection as at 8 with a shaft 9, which through suitable change wheels, such as 10, operates the shaft 6 connected by gear wheels 11 to, and driving the idler wheels of the differential gear $n$. Or, as an alternative, in some cases, the carriage $a$ may be allowed to slide laterally while the saddle $c$ is traveling down; the differential gear being locked, and the correct feed obtained by change wheels only between shaft 9 and screw $y$ (the rack 7 retained to operate shaft 9), to keep the rotations of cutter or hob and the table $d$ upon which the work is mounted, relatively correct; or the traverse of the carriage is combined with the vertical motion of the saddle to give a resulting motion otherwise obtained with the use of the differential gear. The wheel table $d$ may be moved to or from the saddle $c$ or cutter thereon, by means of a hand wheel, (a facing for which is shown at 12 in Fig. 2) or by mechanical feed, as is well understood. The table $d$ in Fig. 3 is thus shown closer to the saddle $c$ than it is in Fig. 1.

For cutting worm wheels, when retardation or acceleration of rotation of the wheel being cut is combined with a horizontal travel of the cutter or hob across the face of the said wheel, motion may be transmitted from the head-stock $j$ through the parts $i$, $h$, 5, 4, 3, 2, 1, $z$, to the feed screw $y$ for giving the requisite transverse or horizontal motion to the carriage $a$ carrying the saddle $c$ along with the cutter $e$, the said cutter being rotated, with its mandrel, through the gearing $m$ in connection with the vertical shaft $l$. The retardation, or acceleration, of the table $d$ may be obtained through the operation of the connected parts $y$, 6, 11, $n$, $o$, $p$, $q$, $r$, $s$, $t$, $u$, $v$.

For cutting spur gears, when a rotating hob at the correct angle has a vertical feed, as the table rotates; change wheels being used to keep the rotation of hob and wheel correct; the vertical motion of the said hob may be obtained by the operation of a vertical screw 14 attached to the saddle $c$, in gear connection with shaft $l$ through gearing 15, shaft 16, and gearing 17, (see Figs. 4 and 1).

For fine vertical feeds, the gear connection named may consist of or be combined with an epicyclic gear 18 in combination with the change wheels or gearing 15 and 17. A bracket for the application of bevel wheels or hand feed device for the screw 14 is shown at 19 in Figs. 4 and 1.

For cutting worms, the work may be mounted vertically upon the table, the axis of the hob or cutter being suitably arranged to correspond. For the vertical feed the true ratio may be obtained from the shaft $l$ to the screw 14, through the gearing 15 and 17, the epicyclic gear 18 not being required. The necessary rotation of the table $d$ may be provided by the use of change wheels, the differential gear $n$ being locked.

For cutting spirals, the epicyclic gear 18 is not required for the vertical feed, but the retardation or acceleration of the rotation of the table to be combined with such vertical feed may be obtained by the use of the rack 7 operating the connected parts 9, 6, 11, $n$, $o$, $p$, $q$, $r$, $s$, $t$, $u$, $v$; or the alternative method of dispensing with the rack arrangement, by utilizing the lateral movement of the carriage $a$ with the vertical feed, may be used, as already described. The epicyclics 18 and 4 are for the purpose of obtaining great reduction of speed within small spaces.

For circular milling, the work may be clamped in position, the milling tool mounted in the place of the hob or cutter at the required angle.

The relative positions of the axes of the hob and the wheel being cut for the cutting of hollow faces gears, such as worm wheels, may be arranged in the ordinary manner well understood.

I claim

In a gear generating machine, and in combination, a carriage mounted for transverse movement in the direction of a wheel-chord parallel to the axis of the hob mandrel, a cutter or hob, mounted upon said carriage, a vertical shaft, mounted upon the carriage and in gear connection with said cutter or hob, a main shaft, in gear connection with said vertical shaft, an epicyclic gear, in gear connection with said main shaft, a disk, operated by said epicyclic, a pair of pawls, operated by said disk, a pair of ratchet wheels, operated by said pawls, a feed screw, engaging said carriage for transverse movement thereof, and connected to said ratchets, a differential gear, in connection with the main shaft and controlled by the said feed screw, and a table, in gear connection with said differential gear, substantially as herein set forth.

In witness whereof I have hereunto set my hand in presence of two witnesses.

ROUGHSEDGE WALLWORK.

Witnesses:
ARTHUR GADD,
THOMAS PARTINGTON.